(12) United States Patent
Kanai et al.

(10) Patent No.: US 11,031,881 B2
(45) Date of Patent: Jun. 8, 2021

(54) OUTPUT CURRENT SYNTHESIZER AND POWER SUPPLY APPARATUS

(71) Applicant: NETUREN CO., LTD., Tokyo (JP)

(72) Inventors: Takahiko Kanai, Tokyo (JP); Yue Yang, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 0 days.

(21) Appl. No.: 16/645,097

(22) PCT Filed: Aug. 23, 2018

(86) PCT No.: PCT/JP2018/031234
§ 371 (c)(1),
(2) Date: Mar. 6, 2020

(87) PCT Pub. No.: WO2019/049679
PCT Pub. Date: Mar. 14, 2019

(65) Prior Publication Data
US 2020/0220478 A1    Jul. 9, 2020

(30) Foreign Application Priority Data
Sep. 11, 2017 (JP) .............................. JP2017-174055

(51) Int. Cl.
*H02M 7/493* (2007.01)
*H02M 7/537* (2006.01)
*H01F 27/28* (2006.01)

(52) U.S. Cl.
CPC ............ *H02M 7/493* (2013.01); *H01F 27/28* (2013.01); *H02M 7/537* (2013.01)

(58) Field of Classification Search
CPC ......... H02M 7/493; H02M 7/53; H02M 7/537
(Continued)

(56) References Cited

U.S. PATENT DOCUMENTS 7,872,887 B2 *  1/2011  Nishio .................. H02M 7/487
                                                363/97
2010/0045113 A1 *  2/2010  Hishikawa ............ H02M 7/483
                                                307/77
(Continued)

FOREIGN PATENT DOCUMENTS

DE    10 2007 063 434    1/2009
EP         3 089 178    11/2016
(Continued)

OTHER PUBLICATIONS

International Search Report and Written Opinion of the International Searching Authority, dated Dec. 5, 2018 in corresponding International Patent Application No. PCT/JP2018/031234.

*Primary Examiner* — Gary A Nash
(74) *Attorney, Agent, or Firm* — Wenderoth, Lind & Ponack, L.L.P.

(57) ABSTRACT

An output current synthesizer that synthesizes output currents output from a plurality of power inverter circuits converting direct current power to alternating current power and outputs the synthesized output currents as synthesized current having a predetermined frequency, the output current synthesizer includes a pair of conductors which is provided with each of the power inverter circuits and to which the output currents of the power inverter circuits flow, a reactor which is provided on each of the pairs of conductors and generates magnetic flux corresponding to a difference between values of currents flowing to the pairs of conductors to reduce the difference between the values of currents, a pair of conductive members to which the pairs of conductors are connected in parallel, and a pair of output terminals which is provided on the pair of conductive members and output the synthesized currents.

13 Claims, 15 Drawing Sheets

(58) Field of Classification Search
USPC .................................................. 363/71, 131
See application file for complete search history.

(56) References Cited

U.S. PATENT DOCUMENTS

| | | |
|---|---|---|
| 2010/0109826 A1 | 5/2010 | Sano et al. |
| 2016/0248315 A1* | 8/2016 | Basic .................... H02M 7/493 |

FOREIGN PATENT DOCUMENTS

| | | | | |
|---|---|---|---|---|
| JP | 2816692 | | | 8/1998 |
| JP | 11-299252 | | | 10/1999 |
| JP | 2005012962 | | | 1/2005 |
| JP | 2005012962 | A | * | 1/2005 |
| JP | 4445216 | | | 1/2010 |
| WO | 2016/085598 | | | 6/2016 |

* cited by examiner

OUTPUT CURRENT SYNTHESIZER AND POWER SUPPLY APPARATUS

TECHNICAL FIELD

The present invention relates to an output current synthesizer that synthesizes output currents of a plurality of power inverter circuits, and a power supply apparatus having the output current synthesizer.

BACKGROUND

Power supply apparatuses in the related art are configured to be able to adjust a frequency of alternating current power supplied to a load such as an induction motor or an induction heater having an inductance component when output of the load is subjected to capacity control. These power supply apparatuses are generally configured such that alternating current power having a desired frequency is obtained by converting alternating current power supplied from a commercial power supply into direct current power using a power rectifier circuit first, and then converting this direct current power into alternating current power using a power inverter circuit that is an inverter.

Maximum output of the power inverter circuit of the power supply apparatus is determined by a capacity of a power controlling switching element that is mainly adopted for the power inverter circuit. For this reason, the power supply apparatus is configured in a simple circuit structure in which, when output is small within a power allowable range of the switching element, a pair of arms U and V are formed by one bridge type as illustrated, for instance, in FIG. 1, that is, four switching elements Q.

According to a first related art, when a larger output capacity is required, a power inverter circuit is formed by connecting numerous switching elements Q in parallel to a pair of arms U and V as illustrated, for instance, in FIG. 12 (see, for example, PTL 1: JP2816692). However, in the power inverter circuit as illustrated in FIG. 12, when a frequency is increased, for instance, to tens of kHz or higher in a circuit structure that is widely used, especially, in a low-frequency region, a variation in current flowing each switching element Q occurs due to a slight difference in inductance between the parallel switching elements Q.

To be specific, in FIG. 12, since the inductance increases in the order from an arm U4 (V1) to an arm U1 (V4) due to a distance relation between an output terminal t and the arm, the current flowing each switching element Q is also reduced in that order. For this reason, a variation in current value occurs within a range of about 20% to 30% between the arm U4 (V1) and the arm U1 (V4) between which the difference of the inductance becomes maximum. In this way, when the variation increases, a reduction rate based on the variation is reduced and used by about 30% with respect to the rating of each switching element as illustrated in a current waveform diagram of FIG. 13 in an example of the configuration illustrated in FIG. 12. For this reason, with respect to a constant output capacity, more switching elements are required, and the circuit structure is complicated, so that there is a fear of incurring a decrease in manufacturability or an increase in apparatus cost.

Therefore, a power supply apparatus of a second related art is configured to prevent a variation in current flowing each switching element, for instance, using a balancer formed of a magnetic material such as a core (see, for example, PTL 2: JPH11-299252A).

For example, as illustrated in FIG. 14, two of leads L connected to, for instance, power inverter circuits of four systems are inserted into cores T of a plurality of magnets formed in a cylindrical shape by a combination of the other leads L in a state in which a direction of electric current becomes the opposite direction. That is, any one of the leads L is inserted from one end side of the core T in an axial direction, and the other lead L is inserted from the other end side of the core T in the axial direction. With this configuration, when values of currents flowing to the two leads L are the same, magnetic fluxes generated by the flows of the currents are in a mutually offset state, and the core T does not act as inductance. Meanwhile, when the values of currents are different (in the case of the variation), the magnetic fluxes are generated at the core T according to a magnitude of a difference between the values of currents, and the inductance for this generated magnetic fluxes occur at the opposite ends of the core T. This inductance acts in a direction in which a variation in the current flowing each of the two leads L is reduced. The variation of the current is efficiently reduced by the plurality of cores T, and an unbalance rate is inhibited to 5% or lower.

In a third related art, as illustrated in, for instance, FIG. 15, power inverter circuits (blocks 1 to 4) of four systems are connected in parallel to a pair of conductive members, in which output terminals are provided at one ends of the conductive members in a longitudinal direction, via a pair of arms U1-V1 to U4-V4 (see, for example, PTL 3: JP4445216). Inductance between connecting positions of the arms U4-V4, which are connected at positions farthest away from the pair of output terminals, and the pair of output terminals is used as a reference, and an inter-conductor distance between the arms U1-V1 is increased, for instance, to be the same inductance as a difference between inductance between connecting positions of the arms U1-V1 and the pair of output terminals and the reference. Likewise, inter-conductor distances between the arms U2-V2 and between the arms U3-V3 are increased depending on connecting positions of the arms U2-V2 and the arms U3-V3, respectively. With this configuration, occurrence of a variation in output current of each of the power inverter circuits of four systems due to a difference in inductance is inhibited.

Further, the pair of arms U1-V1 to U4-V4 are inserted into cores T1 to T4 of magnets formed in a cylindrical shape. With this configuration, when a value of current flowing to the arm U1 and a value of current flowing to the arm V1 are different, for example a reactor formed by inserting the arms U1-V1 into the core T1 generates reactance that reduces a difference between the values of currents. For this reason, additional balance of the output currents that are output from the power inverter circuits of four systems is obtained.

PTL 1: JP2816692
PTL 2: JPH11-299252A
PTL 3: JP4445216

In the power supply apparatus of the second related art, it is limited to the circuit structure in which the power inverter circuits are provided in the even-numbered systems, and it is difficult to improve versatility. In contrast, in the power supply apparatus of the third related art, it is not limited to the circuit structure in which the power inverter circuits are provided in the even-numbered systems, and the versatility is improved.

Meanwhile, a switching element, such as a SiC-MOSFET, having a relatively large capacity has recently been developed, and with the increase of the capacity of the switching element, an output current of one system of the power inverter circuit has also been increased. With the increase of the output current of one system, in the power supply apparatus of the third related art, a large switching element is also used in the pair of arms U1-V1 to U4-V4.

In the power supply apparatus of the third related art, depending on the inductance between the connecting positions of each of the arms U1-V1 to U4-V4 and the pair of output terminals, the inter-conductor distance of each of the arms U1-V1 to U4-V4 is widened, and along with the enlargement of the arms U1-V1 to U4-V4, the enlargement of the cylindrical cores T1 to T4 into which the arms U1-V1 to U4-V4 are inserted is required.

However, diameters of the cylindrical cores that are generally distributed are restricted. When a core having a large diameter out of a typical diameter is manufactured depending on a size and inter-conductor distance of an arm to be inserted, there is a problem that an improvement in manufacturability and a reduction in apparatus cost are hardly achieved. In general, the large-diameter core has a low AL value that is one of characteristics of the core, and there is a concern about a reduction in performance as the reactor that reduces a difference between the values of current flowing to the arm to be inserted.

SUMMARY

One or more embodiments provide an output current synthesizer and a power supply apparatus capable of inhibiting a variation in output currents of power inverter circuits of a plurality of systems with a simple configuration and achieving an improvement in manufacturability and a reduction in apparatus cost.

In an aspect (1), an output current synthesizer that synthesizes output currents output from a plurality of power inverter circuits converting direct current power to alternating current power and outputs the synthesized output currents as synthesized current having a predetermined frequency, the output current synthesizer includes a pair of conductors which is provided with each of the power inverter circuits and to which the output currents of the power inverter circuits flow, a reactor which is provided on each of the pairs of conductors and generates magnetic flux corresponding to a difference between values of currents flowing to the pairs of conductors to reduce the difference between the values of currents, a pair of conductive members to which the pairs of conductors are connected in parallel, and a pair of output terminals which is provided on the pair of conductive members and output the synthesized currents. Inductance between connecting positions of the pair of conductors which is connected at a position farthest away from the pair of output terminals in the pair of conductive members and the pair of output terminals is defined as a reference inductance. One of the pairs of conductors has an inter-conductor distance correlated to a difference of the inductance between the connecting positions of the one of the pairs of conductors and the pair of output terminals, and the reference inductance. Each of the reactors has a first core member and a second core member that are mutually combined and form a ring into which the pair of conductors are insertable. The ring includes two arcs extending in a separating direction of the pair of conductors on a circumference thereof. The first core member and the second core member are separatable in each of the two arcs in the separating direction with a surface intersecting the arcs as a boundary.

In an aspect (2), a power supply apparatus include a plurality of power inverter circuits configured to the convert direct current power to the alternating current power, and the output current synthesizer according to the aspect (1).

According to aspects (1) and (2), the output current synthesizer and the power supply apparatus are capable of inhibiting a variation in output currents of power inverter circuits of a plurality of systems with a simple configuration and achieving an improvement in manufacturability and a reduction in apparatus cost.

DESCRIPTION OF EMBODIMENTS

Figure 1:
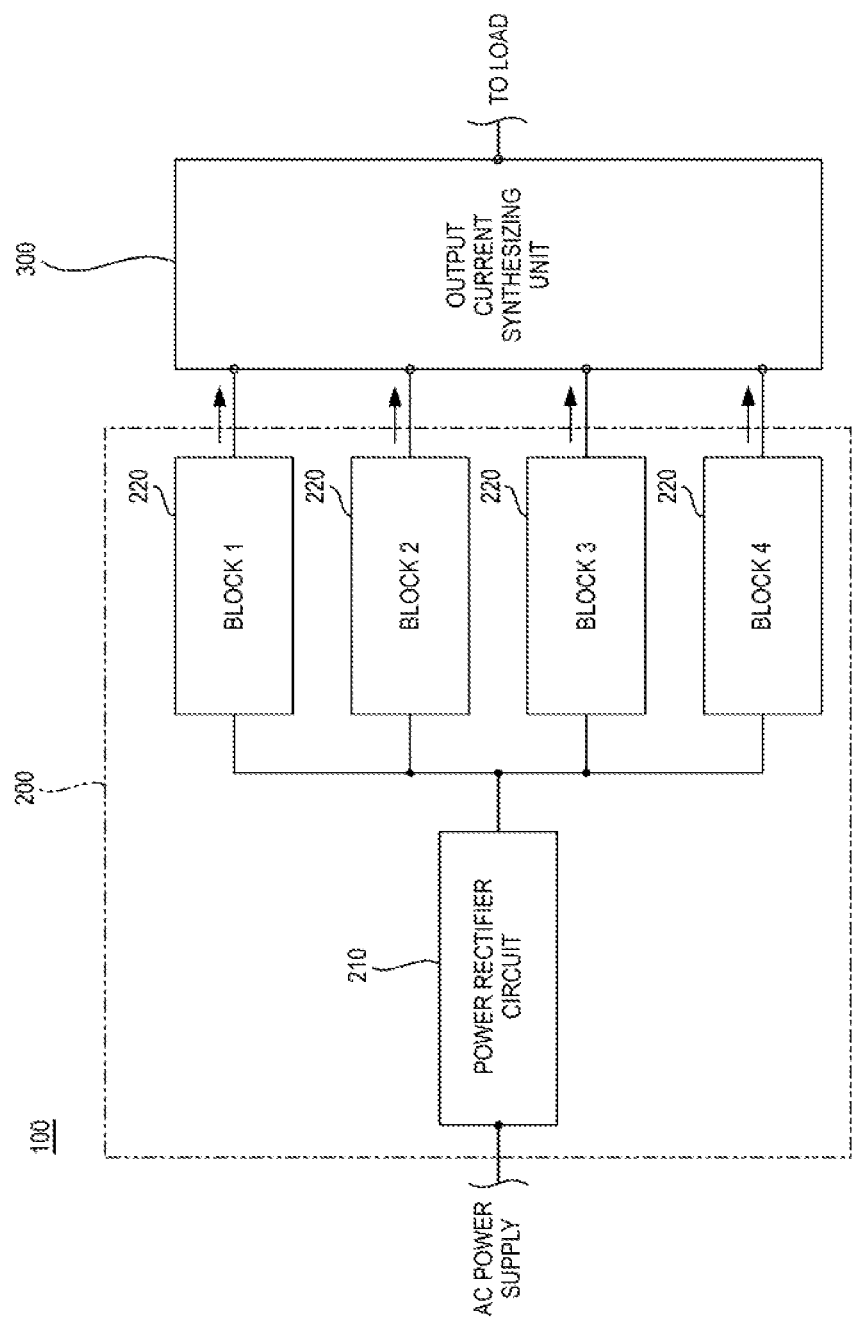
FIG. 1 is a simple connection diagram illustrating a schematic circuit structure of a power supply apparatus according to an embodiment of the present invention.
Figure 2:
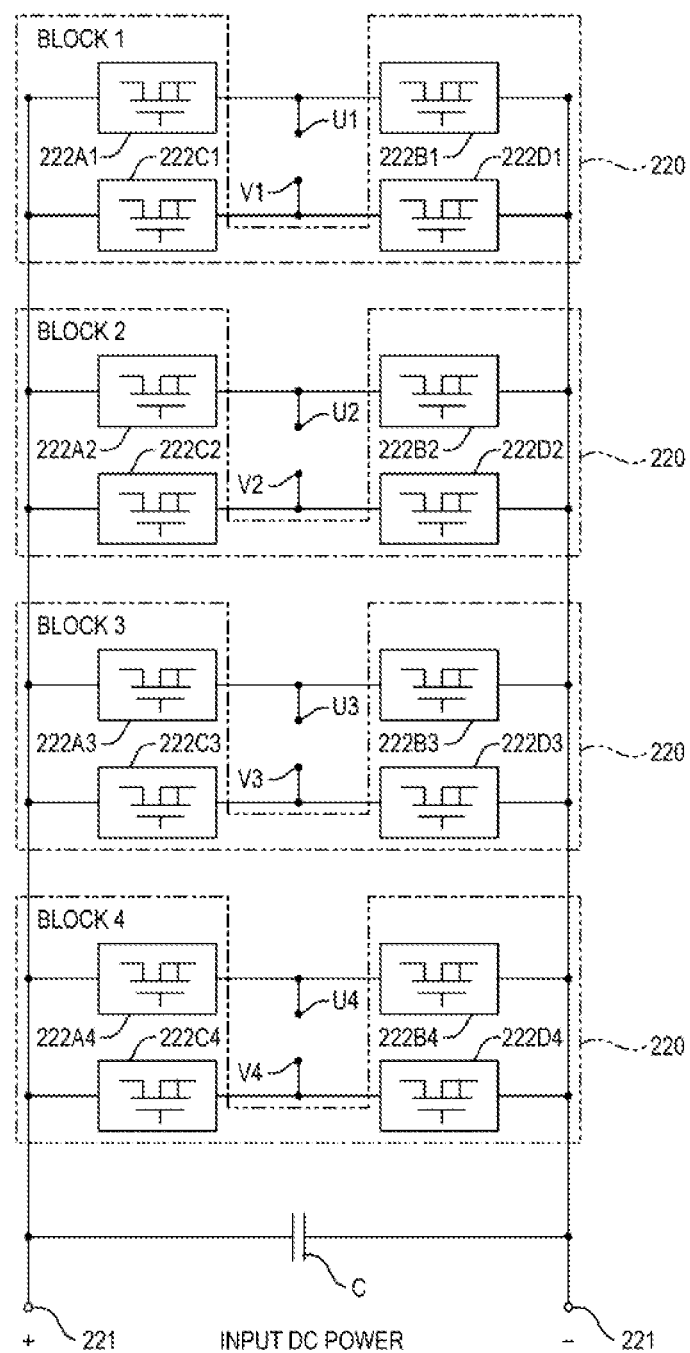
FIG. 2 is a circuit diagram illustrating power inverter circuits in the embodiment.
Figure 3:
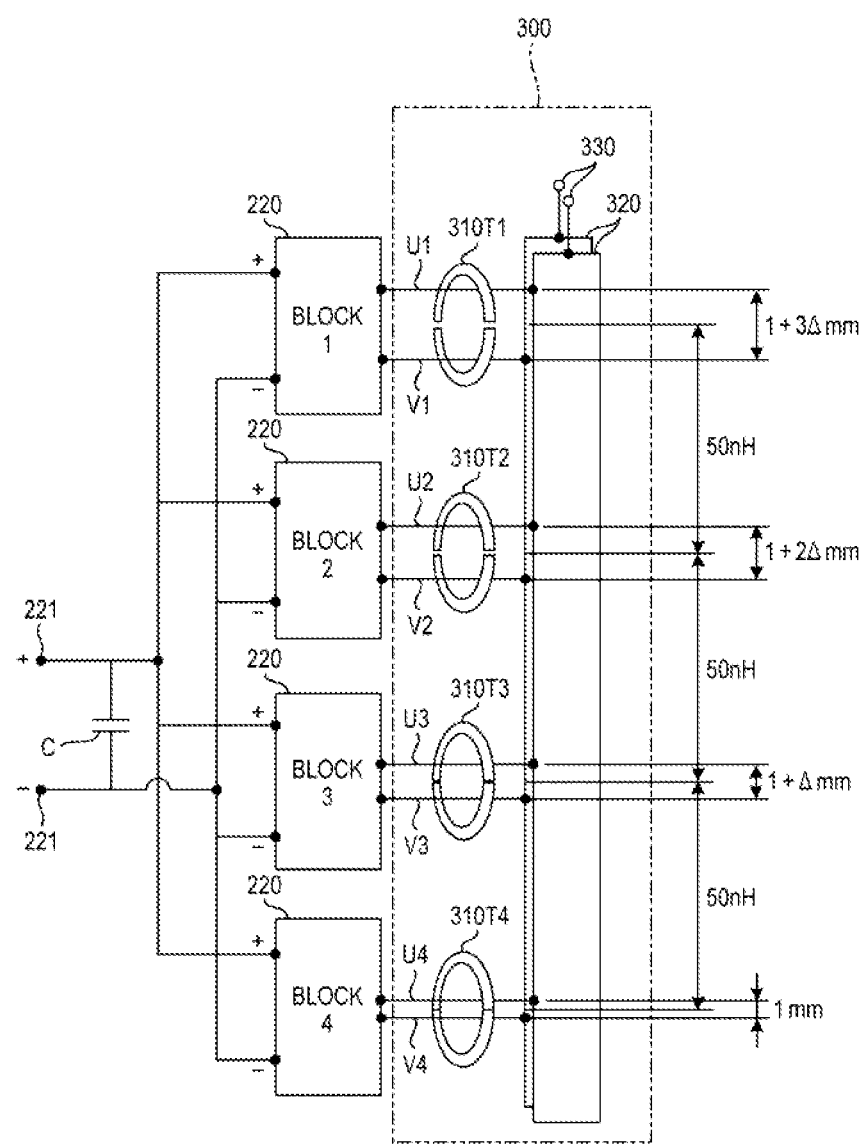
FIG. 3 is a block diagram illustrating a relation between power inverter circuits and an output current synthesizing unit in the embodiment.

Hereinafter, an embodiment of the present invention will be described with reference to the drawings. In the present embodiment, a voltage type power supply apparatus for conversion to high-frequency power used in an induction heater or the like will be described by way of example, but the present embodiment is not limited thereto, and may be applied to a configuration in which power is supplied to any load. A configuration in which balance of output currents from power inverter circuits of four systems is adopted will be given as an example, but the power inverter circuits are not limited to the four systems, and may correspond to a plurality of systems. FIG. 1 is a simple connection diagram illustrating a schematic circuit structure of a power supply apparatus according to the present embodiment. FIG. 2 is a circuit diagram illustrating power inverter circuits. FIG. 3 is a block diagram illustrating a relation between power inverter circuits and an output current synthesizing unit.

(Configuration of Power Supply Apparatus)

In FIG. 1, 100 indicates a power supply apparatus, and this power supply apparatus 100 converts alternating current (AC) power supplied from, for instance, a three-phase AC power supply to AC power having a necessary frequency. The power supply apparatus includes a power conversion circuit 200 and an output current synthesizing unit 300 acting as an output current synthesizer.

The power conversion circuit 200 converts, for instance, three-phase AC power that is commercial AC power supply to AC power having a predetermined frequency. The power conversion circuit 200 has one power rectifier circuit 210, and power inverter circuits 220 (blocks 1 to 4) that are for instance inverters of four systems.

The power rectifier circuit 210 converts the three-phase AC power that is the commercial AC power supply to direct current (DC) power. The power rectifier circuit 210 has for instance a thyristor that is an active rectifying device having a gate that is a control electrode, and for instance a capacitor that is a smoothing device that smoothes out DC power including ripples rectified by this thyristor. The thyristor is controlled such that an output voltage thereof becomes a predetermined voltage during operation. The smoothing device is not limited to the capacitor, and may be a device using a reactor or the like. That is, the smoothing device may use either a current type or a voltage type. In place of the active rectifying device such as the thyristor, the rectification may be performed using, for instance, a diode that is a passive rectifying device.

For example, as illustrated in FIGS. 2 and 3, the power inverter circuits 220 of four systems have a pair of input terminals 221 to which the DC power converted by the power rectifier circuit 210 is applied. A plurality of series circuits, to each of which a pair of switching elements 222 such as metal oxide semiconductor field-effect transistors (MOSFETs) formed of, for instance, Si or SiC are connected in series are connected in parallel between these input terminals 221. That is, the series circuits, in each of which a source of one of the switching elements 222 is connected to a drain of the other switching element 222, are configured. A control voltage signal sent by a phase-locked loop circuit (not shown) is simultaneously input to a gate of each switching element 222. The phase-locked loop circuit is controlled such that a frequency of the AC power output from the power supply apparatus becomes a resonant frequency of a load.

Arms U1 to U4 and V1 to V4 that are conductors are provided at connecting points of the switching elements 222 in the series circuits. For these arms U1 to U4 and V to V4, a bus bar formed of, for instance, copper having excellent conductivity is used. As illustrated in FIG. 2, the first power inverter circuit 220 (the block 1) is made up of switching elements 222A1, 222B1, 222C1 and 222D1. The second power inverter circuit 220 (the block 2) is made up of switching elements 222A2, 222B2, 222C2 and 222D2. The third power inverter circuit 220 (the block 3) is made up of switching elements 222A3, 222B3, 222C3 and 222D3. The fourth power inverter circuit 220 (the block 4) is made up of switching elements 222A4, 222B4, 222C4 and 222D4. The pair of arms U1-V1 are provided in the block 1. The pair of arms U2-V2 are provided in the block 2. The pair of arms U3-V3 are provided in the block 3. The pair of arms U4-V4 are provided in the block 4.

A capacitor (not shown) is provided in each of the blocks 1 to 4 between positive and negative electrode sides of each of the power inverter circuits 220 (the blocks 1 to 4) of four systems. In FIGS. 2 and 3, the capacitor provided in each of the blocks 1 to 4 is shown as an equivalent capacitor C connected between the input terminals 221. In the present embodiment, a description has been made of the case in which eight series circuits acting as the series circuits for the switching elements 222 are connected in parallel to form four blocks 1 to 4, but the number of series circuits and the number of blocks are not limited thereto.

The output current synthesizing unit 300 keeps a balance of the output currents of the four systems by equalizing magnitudes of the currents output from the power inverter circuits 220 of four systems. This output current synthesizing unit 300 has a plurality of reactors 310, a pair of conductive members 320, and a pair of synthesized current output terminals 330.

For example, annular cores, each of which is formed of a magnetic material, are used as the reactors 310. For example, four reactors 310 are provided corresponding to the power inverter circuits 220 of four systems (the blocks 1 to 4). These reactors 310 are arranged with the pair of arms U1-V1 to U4-V4 of the blocks 1 to 4 inserted into inner circumference sides thereof. To be specific, the arms U1-V1 guided from the block 1 are inserted into the reactor 310T1, the arms U2-V2 guided from the block 2 are inserted into the reactor 310T2, the arms U3-V3 guided from the block 3 are inserted into the reactor 310T3, and the arms U4-V4 guided from the block 4 are inserted into the reactor 310T4.

The pair of conductive members 320 function as bus bars, are connected to the pair of arms U1-V1 to U4-V4, and synthesize the output currents output from the power inverter circuits 220 of four systems. For example, copper plates, each of which is formed of copper having excellent conductivity and has a thickness dimension of about 3 mm to 4 mm, are used as the conductive members 320. The synthesized current output terminals 330 are connected to one ends of the conductive members 320 in a longitudinal direction. The pair of synthesized current output terminals 330 output synthesized currents synthesized by the pair of conductive members 320. For example, the pair of synthesized current output terminals 330 are connected to a load such as an induction motor or an induction heating coil that is not shown, supply the synthesized currents synthesized by the pair of conductive members 320 to the load, and activate the load, for instance, by driving the induction motor or induction-heating an object to be heated using the induction heating coil.

The pair of conductive members 320 connect the pair of arms U1-V1 to U4-V4 on predetermined conditions. That is, the conductive members 320 connect the pair of arms such that the power inverter circuits 220 of four systems (the blocks 1 to 4) are in a parallel state, and such that the inductances of the blocks 1 to 4 have the same value in a relation between the pair of conductive members 320 and the connecting positions of the pair of arms U1-V1 to U4-V4. To be specific, on the basis of the block 4 that is connected at a distance farthest away from the pair of synthesized current output terminals 330 and in which the inductance originating in the pair of conductive members 320 is maximized, the conductive members 320 connect the arms U1-V1 to U4-V4 such that gaps (inter-conductor distances) of the arms U1-V1 to U4-V4 are widened as the connecting position approaches the pair of synthesized current output terminals 330, and increase the inductance originating in the gap of the pair of arms.

For example, the copper plates of the pair of conductive members 320 have a width dimension of 100 mm and a gap of 2 mm, and when the pair of arms U to U4-V1 to V4 are connected in a parallel state at intervals of 160 mm in the longitudinal direction of the pair of conductive members 320, the inductance of the pair of conductive members 320 between the two neighboring connecting positions among the connecting positions of the arms U1-V1 to U4-V4 becomes about 50 nH. When the gap between the arms U4-V4 of the block 4 is 1 mm, the inductance originating in the gap between the arms U3-V3 is increased by 50 nH by setting the gap between the arms U3-V3 of the blocks 3 at a position at which the inductance originating in the pair of conductive members 320 is reduced by 50 nH to 1+Δ mm, the inductance originating in the gap between the arms U2-V2 is increased by 100 nH by setting the gap between the arms U2-V2 of the block 2 at a position at which the inductance originating in the pair of conductive members 320 is further reduced by 50 nH (100 nH in total) to 1+2Δ mm, and the inductance originating in the gap between the arms U1-V1 is increased by 150 nH by setting the gap between the arms U1-V1 of the block 1 at a position at which the inductance originating in the pair of conductive members 320 is further reduced by 50 nH (150 nH in total) to 1+3Δ mm. The value of Δ is associated with the shape or the like of each of the pair of arms U1-V1 to U4-V4. For example, when a copper pipe having a rectangular cross section, one side of which is 25 mm is used as each of the arms U1-V1 to U4-V4, the value of Δ is about 6 mm.

(Operation of Power Supply Apparatus)

Figure 4:
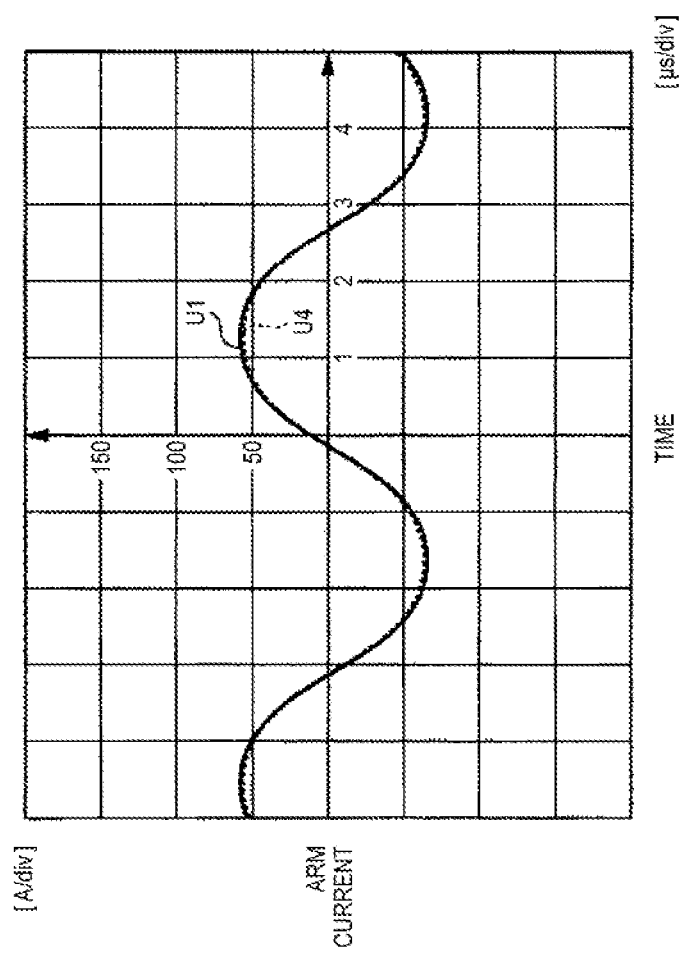
FIG. 4 is a waveform diagram illustrating a relation between current values of arms V1 and V4 in the embodiment.

Next, an operation of the power supply apparatus of the above embodiment will be described with reference to the drawings. FIG. 4 is a waveform diagram illustrating a relation between current values of the arms V1 and V4.

First, commercial AC power is converted to a predetermined DC power supply by the power rectifier circuit 210 of the power conversion circuit 200. The converted DC power is converted to AC power having a predetermined frequency (high frequency) by the power inverter circuits 220 of four systems (the blocks 1 to 4) of the power conversion circuit 200, and the convened AC power is output to the output current synthesizing unit 300 via the pair of arms U1-V to U4-V4.

In the event of output of the AC power to the output current synthesizing unit 300, when output currents flow to the pair of arms U1-V1 to U4-V4, magnetic fluxes corresponding to the currents flowing to these pairs of arms U1-V1 to U4-V4 are generated at the reactors 310. Since the currents flow to the pairs of arms U1-V1 to U4-V4 in directions opposite to each other, the pairs of arms U1-V1 to U4-V4 and the reactors constitute differential reactors. For example, the differential reactor is configured such that, if the currents flowing to the arm U1 and the arm V1 in the directions opposite to each other are uniform, each other's magnetic fluxes are offset, a synthesized magnetic flux becomes zero, and reactance becomes zero. Meanwhile, when the output currents flowing to the arm U1 and the arm V1 are not uniform, reactance for inhibiting the output currents against the arms of large output currents due to an action of the differential reactor is generated. For this reason, balance of the output currents between the arms U-V is obtained at each of the pairs of arms U1-V1 to U4-V4.

Further, since the output currents of the blocks 1 to 4 which are balanced and flow to the pair of conductive members 320 of the output current synthesizing unit 300 become inductances whose values are the same at the connecting positions of the pairs of arms U1-V1 to U4-V4 in the pair of conductive members 320, the output currents are favorably synthesized by the pair of conductive members 320, and are output from the pair of synthesized current output terminals 330 as synthesized currents. To be specific, as illustrated in FIG. 4, a value of the current flowing to the arm V1 that is the connecting position closest to the pair of synthesized current output terminals 330 and a value of the current flowing to the arm V4 that is the connecting position farthest away from the pair of synthesized current output terminals 330 are approximately the same value. The output and synthesized AC power having a predetermined frequency is supplied to a load, and the load is properly activated. For example, an induction heating coil induction-heats an object to be heated.

(Operation and Effects of Embodiment)

As described above, in the above embodiment, the pairs of arms U1-V1 to U4-V4 are connected in a state in which inductances based on distances up to the pair of synthesized current output terminals 330 at the connecting positions of the pairs of arms U1-V1 to U4-V4, which conduct the output currents output from the power inverter circuits 220 of four systems (the blocks 1 to 4), to the pair of conductive members 320 have the same value. To be specific, the gaps of the arms U1-V1, U2-V2 and U3-V3 are widened in a state in which the inductance of the connecting positions of the pair of arms U4-V4 of the block 4 connected to the pair of conductive members 320 at the position farthest away from the pair of synthesized current output terminals 330 is set to a reference, and becomes the same inductance as a difference between the inductances at the connecting positions of the arm U1-V1 to U3-V3 of the other blocks 1 to 3, and the arms U1-V1I to U3-V3 are connected. For this reason, it is possible to prevent the occurrence of a variation in each output current due to a difference in inductance between the power inverter circuits 220 of four systems, to favorably synthesize the output currents, and to output stable and favorable synthesized currents. Since each of the pairs of arms U1-V1 to U4-V4 of the power inverter circuits 220 of four systems (the blocks 1 to 4) is connected to the pair of conductive members 320, the number of systems for the connected power inverter circuits 220 can be easily increased/reduced, and manufacturability can also be improved in a simple structure that is rich in versatility and is connected to each system. Since the stable and favorable synthesized currents can be output, the load can be activated in a stable favorable way.

The magnetic fluxes corresponding to a difference between the values of currents flowing to each of the pairs of arms U1-V1 to U4-V4 are generated at each of the pairs of arms U1-V1 to U4-V4 by each of the reactors 310, and the inductance is generated in a direction in which it reduces a difference in current between the arms. For this reason, a variation in output current between the arms U-V can be prevented at each of the pairs of arms U1-V1 to U4-V4, balance of the output currents to be synthesized can be obtained, and the manufacturability can be easily improved because the manufacture needs only to be done in consideration of only a difference in inductance at the connecting position of the pair of conductive members 320.

The annular cores, each of which is formed of a magnetic material, are used as the reactors 310, and the pairs of arms U1-V1 to U4-V4 are inserted into the inner circumference sides of the cores. For this reason, the variation in output current between the arms U-V can be prevented at each of the pairs of arms U1-V1 to U4-V4, the number of systems for the connected power inverter circuits 220 can be easily increased/reduced, and a configuration that is rich in versatility and can improve the manufacturability can be easily obtained in a simple structure.

The conductive members 320 are formed in a long shape, and the synthesized current output terminals 330 are provided at the one ends of the conductive members 320 in the longitudinal direction. For this reason, a difference in inductance based on distances from the connecting positions of the pairs of arms U1-V to U4-V4 from the power inverter circuits 220 of four systems (the blocks 1 to 4) to the pair of conductive members 320 to the pair of synthesized current output terminals 330 can be easily found, differential inductance at each of the connecting positions can be easily set for the purpose of preventing a variation in the output currents that are output from the power inverter circuits 220 of four systems (the blocks 1 to 4), the manufacturability can be improved, and the stable and favorable synthesized currents can be easily obtained.

Further, the pairs of arms U1-V1 to U4-V4 are connected to the pair of conductive members 320 such that the power inverter circuits 220 of four systems (the blocks 1 to 4) are approximately in a parallel state in the longitudinal direction of the conductive members 320 formed in a long shape. For this reason, the stable and favorable synthesized currents can be easily obtained by preventing the variation in the output currents, the number of systems for the connected power inverter circuits 220 can be easily increased/reduced, and the configuration that is rich in versatility and can improve the manufacturability can be easily obtained in a simple structure.

The plurality of switching elements 222 are connected in a bridge shape to constitute the power inverter circuits 220 (the blocks 1 to 4). For this reason, a configuration in which the pair of conductive members 320 are connected to each of the pairs of arms U1-V1 to U4-V4 that conduct the output currents output from the power inverter circuits 220 of four systems (the blocks 1 to 4) and the number of systems for the connected power inverter circuits 220 can be easily increased/reduced can be easily obtained in a simple structure.

The power inverter circuits 220 are configured to convert the DC power from the power rectifier circuit 210 to the AC power of the high frequency. For this reason, even in the case of the high frequency exerting a great influence on the value of current flowing to each of the switching elements 222 due to a slight difference in inductance between the switching elements 222 connected in parallel to the power inverter circuit 220, especially, as illustrated in FIG. 2, the variation in current can be prevented, and the stable synthesized current can be easily obtained in a simple structure.

Next, a configuration example of the reactor 310 will be described.

Figure 5A:
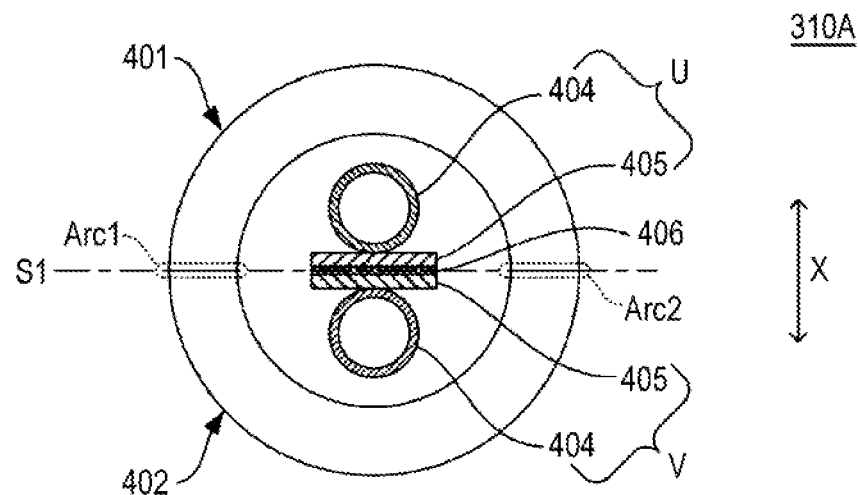
FIG. 5A is a schematic diagram illustrating a configuration example of a reactor in the embodiment.
Figure 5B:
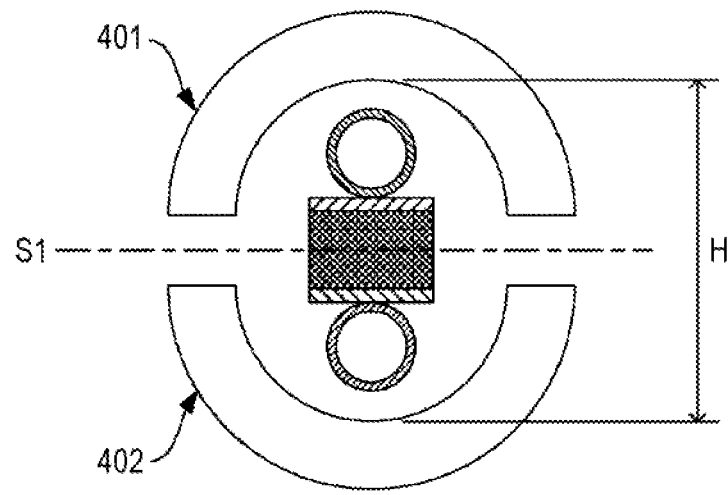
FIG. 5B is a schematic diagrams illustrating a configuration example of a reactor in the embodiment.

The reactor 310A illustrated in FIGS. 5A and 5B has a first core member 401 and a second core member 402. As illustrated in FIG. 5A, the first core member 401 and the second core member 402 are mutually combined, thereby forming an approximately circular ring into which the pair of arms U-V can be inserted.

In examples illustrated in FIGS. 5A and 5B, each of the arms U and V is made up of a metal pipe 404 that is formed of a metal material such as copper having excellent conductivity and has an approximately circular cross section, and a metal plate 405 that is joined to an outer circumferential surface of the metal pipe 404 in a state in which it is electrically connected to the metal pipe 404 by brazing or the like. The pair of arms U-V are arranged in a state in which the metal plates 405 of both the arms face each other with a gap, and an insulating plate 406 is disposed in the gap. Current densities of output currents of a switching circuit which flow to the pair of arms U-V are caused by a skin effect and a proximity effect, and are increased at a facing portion between both the arms. The facing portion is defined by the metal plates 405, so that resistance is reduced, and a loss is also reduced.

The approximately circular ring formed by a combination of the first core member 401 and the second core member 402 includes two arcs Arc1 and Arc2, which extend in a separating direction X between the pair of arms U and V, that is, in a facing direction of the metal plates 405 of both the arms, on a circumference thereof. As illustrated in FIG. 5B, the first core member 401 and the second core member 402 can be separated in each of the arcs Arc1 and Arc2 in the separating direction X with a surface S1 intersecting the arcs as a boundary. The surface S1 is a surface that includes a central axis of the ring, and both the first core member 401 and the second core member 402 separated by this surface S1 as the boundary are formed in a semicircular shape, and have the same shape as each other.

As the first core member 401 and the second core member 402 are separated in the separating direction X, a dimension H between inner circumferences thereof into which the pair of arms U-V are inserted in the separating direction is enlarged, and the gap between the pair of arms U-V can be enlarged. For example, as described above, when the gap between the pair of arms U4-V4 is set to 1 mm, the gap between the pair of arms U3-V3 is set to 1+Δ mm, the gap between the pair of arms U2-V2 is set to 1+2Δ mm, the gap between the pair of arms U1-V1 is set to 1+3Δ mm, and the arms U-V inserted into the reactor 310A is the arms U4-V4, the first core member 401 and the second core member 402 are mutually combined as illustrated in FIG. 5A. When the pair of arms U-V are the arms U1-V1, the arms U2-V2, or the arms U3-V3, the first core member 401 and the second core member 402 are separated depending on the gap in the separating direction X as illustrated in FIG. SB.

In this way, as the reactor 310A has the first core member 401 and the second core member 402 that can be separated in the separating direction X between the pair of arms U-V, the single reactor 310A can deal with various gaps between the arms, and the arms having a relatively large gap can also be inserted. Thereby, the manufacturability can be improved, and the apparatus cost can be reduced.

Figure 5C:
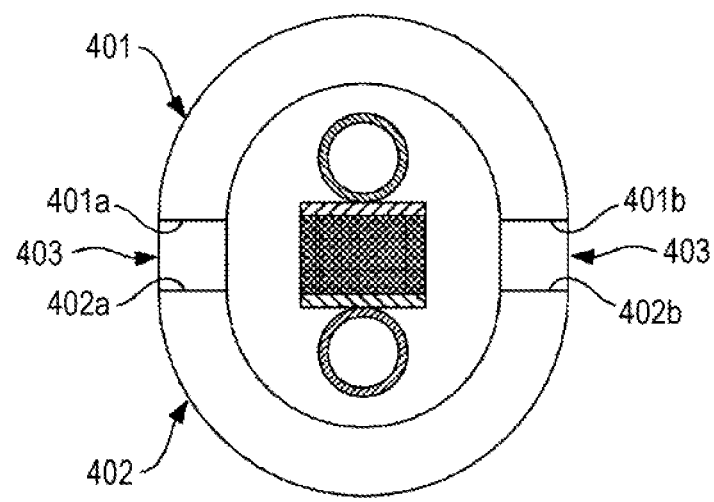
FIG. 5C is a schematic diagrams illustrating a configuration example of a reactor in the embodiment.

As illustrated in FIG. 5C, the reactor 310A may further have one or more rod-like third core members 403 between facing surfaces 401a-402a and/or facing surfaces 401b-402b of the first core member 401 and the second core member 402 that are separated in the separating direction X wherein the facing surfaces face each other in the separating direction X. The third core members 403 are provided, and fill a void between the facing surfaces 401a-402a and/or a void between the facing surfaces 401b-402b, and thereby a rise in magnetic resistance value of the reactor 310A can be inhibited, and performance of the reactor 310A can be maintained. As a material that fills the void between the facing surfaces 401b-402b, a magnetic material may be given as an example, but the material is not limited to the magnetic material.

Figure 6A:
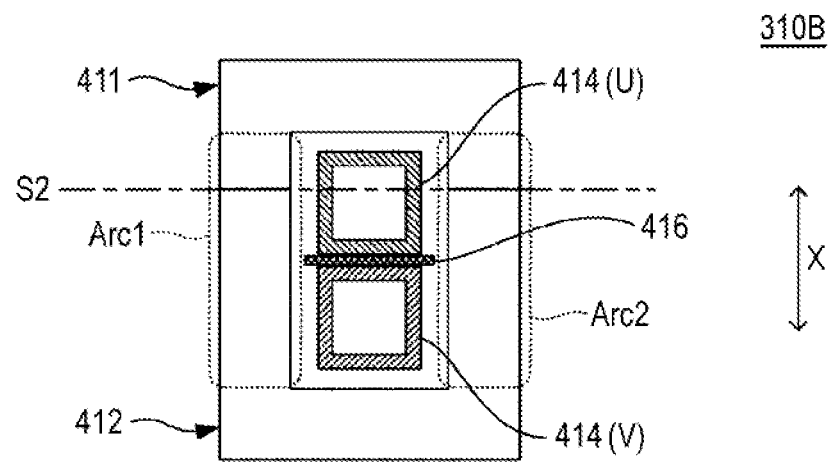
FIG. 6A is a schematic diagram illustrating another configuration example of the reactor in the embodiment.
Figure 6B:
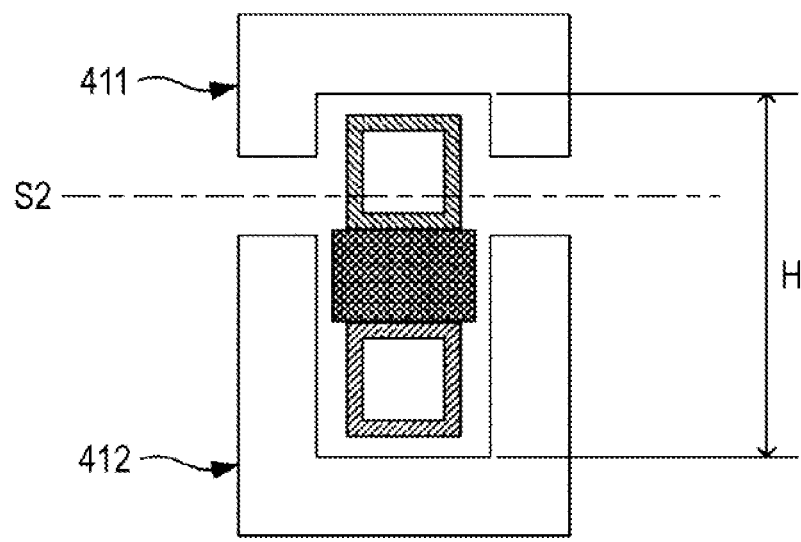
FIG. 6B is a schematic diagram illustrating another configuration example of the reactor in the embodiment.

A reactor 310B illustrated in FIGS. 6A and 6B has a first core member 411 and a second core member 412. As illustrated in FIG. 6A, the first core member 411 and the second core member 412 are mutually combined, thereby forming an approximately rectangular ring into which the pair of arms U-V can be inserted.

In examples illustrated in FIGS. 6A and 6B, each of the arms U and V is made up of a metal pipe 414 that has an approximately rectangular cross section. The pair of arms U-V are arranged in a state in which one surfaces of the metal pipes 414 of both the arms face each other with a gap, and an insulating plate 416 is disposed in the gap. A facing portion between both the arms between which current densities of output currents which flow to the pair of arms U-V are increased is defined by the one surfaces of the metal pipes 414 having the approximately rectangular cross section, and thereby the metal plates 405 joined to the metal pipes 404 that have the approximately circular cross section and are illustrated in FIG. 5A or the like are not necessary. Thereby, the manufacturability can be improved, and the apparatus cost can be reduced. The reactor 310B is also configured as an approximately rectangular ring for the arms U and V made up of the metal pipes 414 having the approximately rectangular cross section, and thereby a space of an inner circumference side of the reactor 310B into which the pair of arms U-V are inserted can be effectively utilized.

The approximately rectangular ring formed by a combination of the first core member 411 and the second core member 412 includes two arcs Arc1 and Arc2, which extend in a separating direction X between the pair of arms U and V, on a circumference thereof. As illustrated in FIG. 6B, the first core member 411 and the second core member 412 can be separated in each of the arcs Arc1 and Arc2 in the separating direction X with a surface S2 intersecting the arcs as a boundary. The surface S2 is a surface that is perpendicular to the separating direction X, and both the first core member 411 and the second core member 412 separated by this surface S2 as the boundary are formed in an approximate U shape.

As the first core member 411 and the second core member 412 are separated in the separating direction X, a dimension H between inner circumferences thereof into which the pair of arms U-V are inserted in the separating direction is enlarged, and the gap between the pair of arms U-V can be enlarged. Therefore, the single reactor 310B can deal with various gaps between the arms, and the arms having a relatively large gap can also be inserted. Thereby, the manufacturability can be improved, and the apparatus cost can be reduced.

Figure 6C:
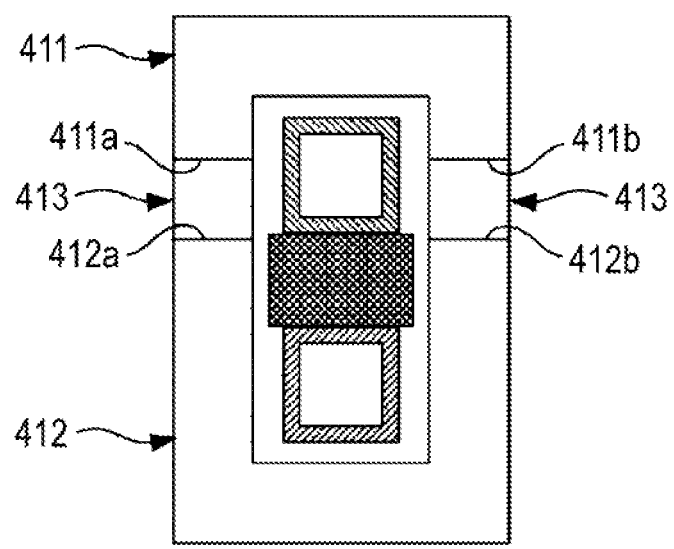
FIG. 6C is a schematic diagram illustrating another configuration example of the reactor in the embodiment.

As illustrated in FIG. 6C, the reactor 310B may further have one or more rod-like third core members 413 that are arranged between facing surfaces 411a-412a and/or facing surfaces 411b-412b of the first core member 411 and the second core member 412 that are separated in the separating direction X wherein the facing surfaces face each other in the separating direction X. The third core members 413 are provided, and fill a void between the facing surfaces 411a-412a and/or a void between the facing surfaces 411b-412b, and thereby a rise in magnetic resistance value of the reactor 310B can be inhibited, and performance of the reactor 310B can be maintained. As a material that fills the void between the facing surfaces 411b-412b, a magnetic material may be given as an example, but the material is not limited to the magnetic material.

Figure 7:
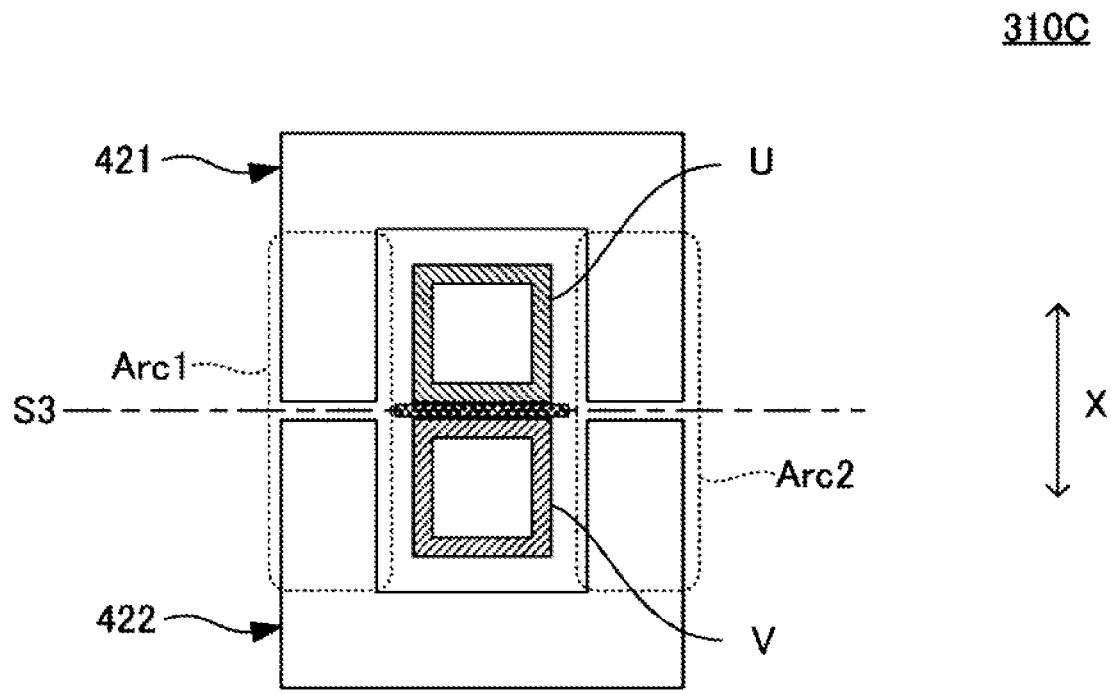
FIG. 7 is a schematic diagram illustrating yet another configuration example of the reactor in the embodiment.

A reactor 310C illustrated in FIG. 7 has a first core member 421 and a second core member 422, and the first core member 421 and the second core member 422 are mutually combined, thereby forming an approximately rectangular ring into which the pair of arms U-V can be inserted. The ring includes two arcs Arc1 and Arc2, which extend in a separating direction X between the pair of arms U and V, on a circumference thereof, and the first core member 421 and the second core member 422 can be separated in each of the arcs Arc and Arc2 in the separating direction X with a surface S3 intersecting the arcs as a boundary. The surface S3 is a surface that is perpendicular to the separating direction X and includes a central axis of the ring. Both the first core member 421 and the second core member 422 separated by this surface S3 as the boundary are formed in an approximate U shape and have the same shape as each other.

Figure 8:
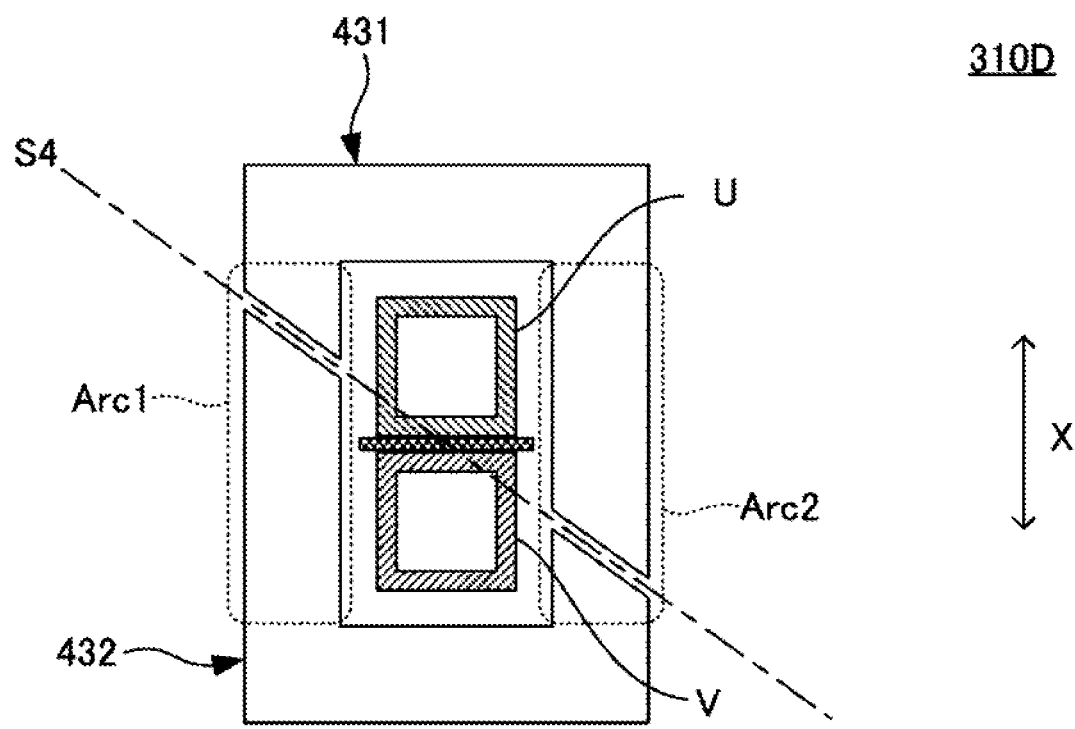
FIG. 8 is a schematic diagram illustrating still yet another configuration example of the reactor in the embodiment.

A reactor 310D illustrated in FIG. 8 has a first core member 431 and a second core member 432, and the first core member 431 and the second core member 432 are mutually combined, thereby forming an approximately rectangular ring into which the pair of arms U-V can be inserted. The ring includes two arcs Arc1 and Arc2, which extend in a separating direction X between the pair of arms U and V, on a circumference thereof, and the first core member 431 and the second core member 432 can be separated in each of the arcs Arc1 and Arc2 in the separating direction X with a surface S4 intersecting the arcs as a boundary. The surface S4 is a surface that is inclined with respect to the separating direction X and includes a central axis of the ring. Both the first core member 431 and the second core member 432 separated by this surface S4 as the boundary are formed in an approximate J shape and have the same shape as each other.

Figure 9:
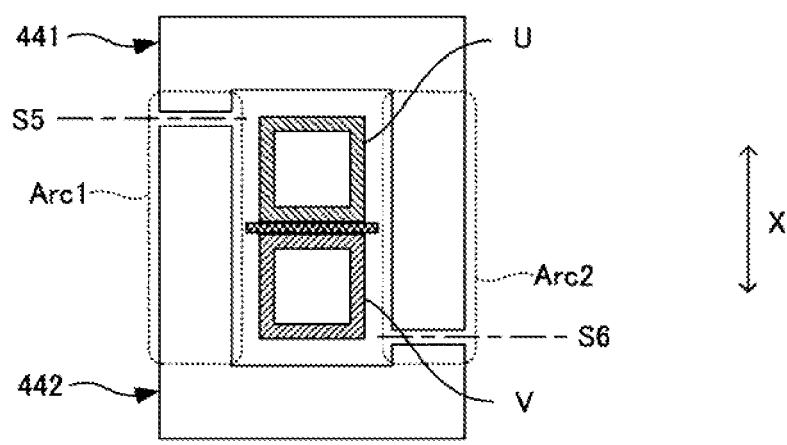
FIG. 9 is a schematic diagram illustrating still yet another configuration example of the reactor in the embodiment.

A reactor 310E illustrated in FIG. 9 has a first core member 441 and a second core member 442, and the first core member 441 and the second core member 442 are mutually combined, thereby forming an approximately rectangular ring into which the pair of arms U-V can be inserted. The ring includes two arcs Arc1 and Arc2, which extend in a separating direction X between the pair of arms U and V, on a circumference thereof, and the first core member 441 and the second core member 442 can be separated in the separating direction X with a surface S5 intersecting the arc Arc1 as a boundary and with a surface S6 intersecting the arc Arc2 as a boundary. The surfaces S5 and S6 are surfaces that are symmetrical in terms of a central axis of the ring. Both the first core member 441 and the second core member 442 separated by these surfaces S5 and S6 as the boundaries are formed in an approximate J shape and have the same shape as each other.

As the examples illustrated in FIGS. 7 to 9, the first core member and the second core member are formed in the same shape, and thereby the manufacturability can be improved, and the apparatus cost can be reduced. In the examples illustrated in FIGS. 7 to 9, the reactor may also further have one or more rod-like third core members that are arranged between facing surfaces of the first core member and the second core member that are separated in the separating direction X wherein the facing surfaces face each other in the separating direction X.

While the present invention has been described with the preferred embodiments, the present invention is not limited to the embodiment, and various improvements and a change in design are possible without departing from the spirit and scope of the present invention.

That is, as described above, the present invention is not limited to the configuration in which the converted AC power is supplied to the load, and can be applied to any configuration. The supplied AC power is not limited to the high-frequency AC power.

Figure 10:
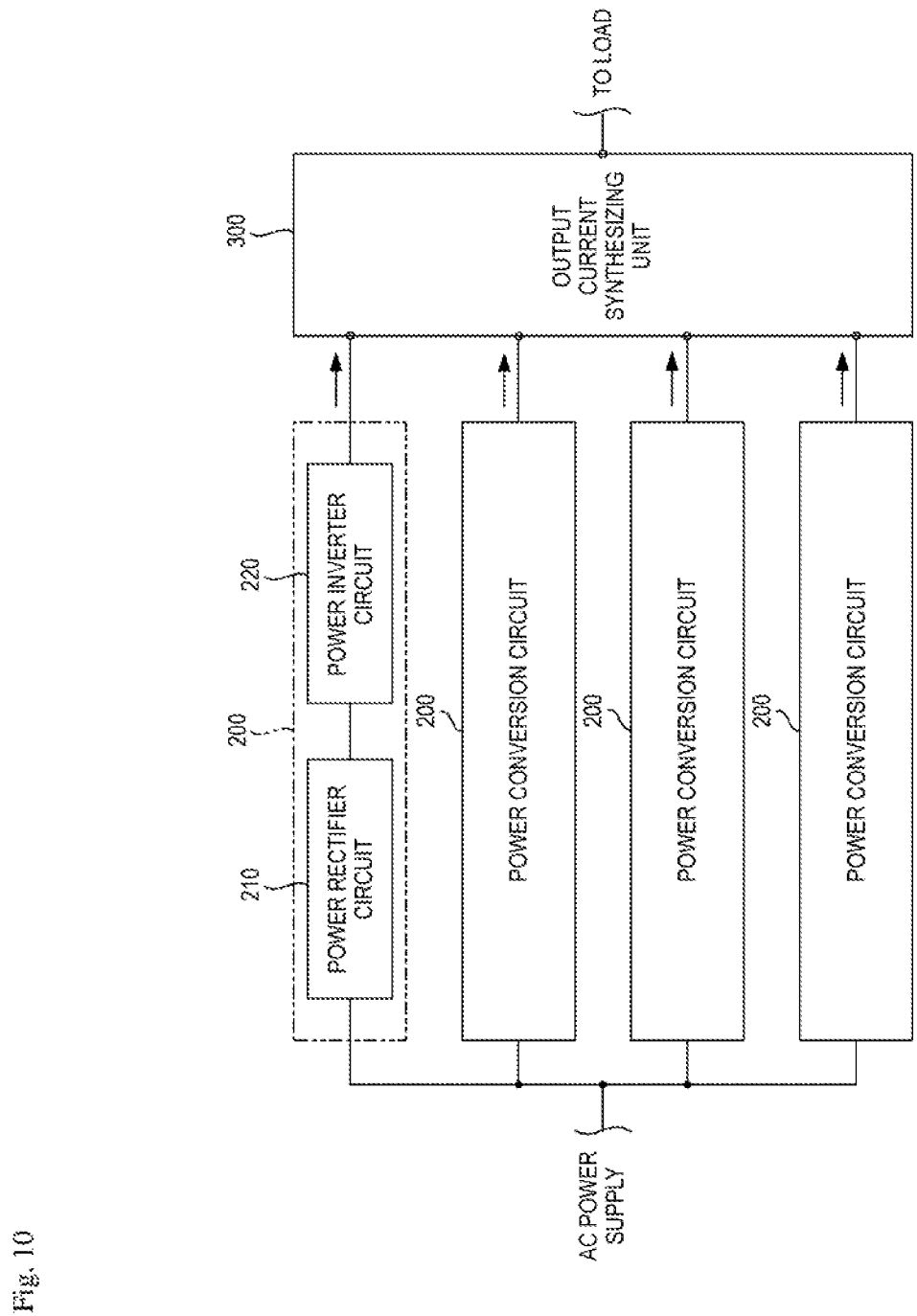
FIG. 10 is a simple connection diagram illustrating a schematic circuit structure of a power supply apparatus according to another embodiment of the present invention.
Figure 11:
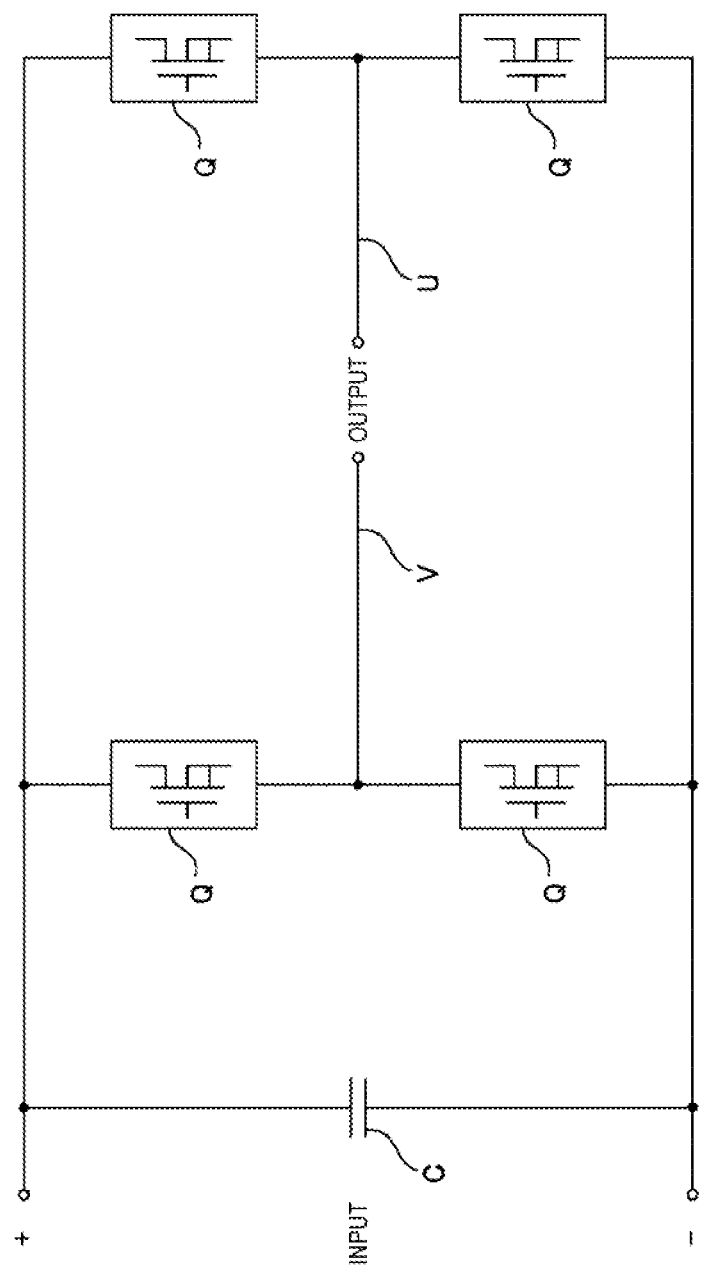
FIG. 11 is a circuit diagram illustrating power inverter circuits in a power supply apparatus of a related art.
Figure 12:
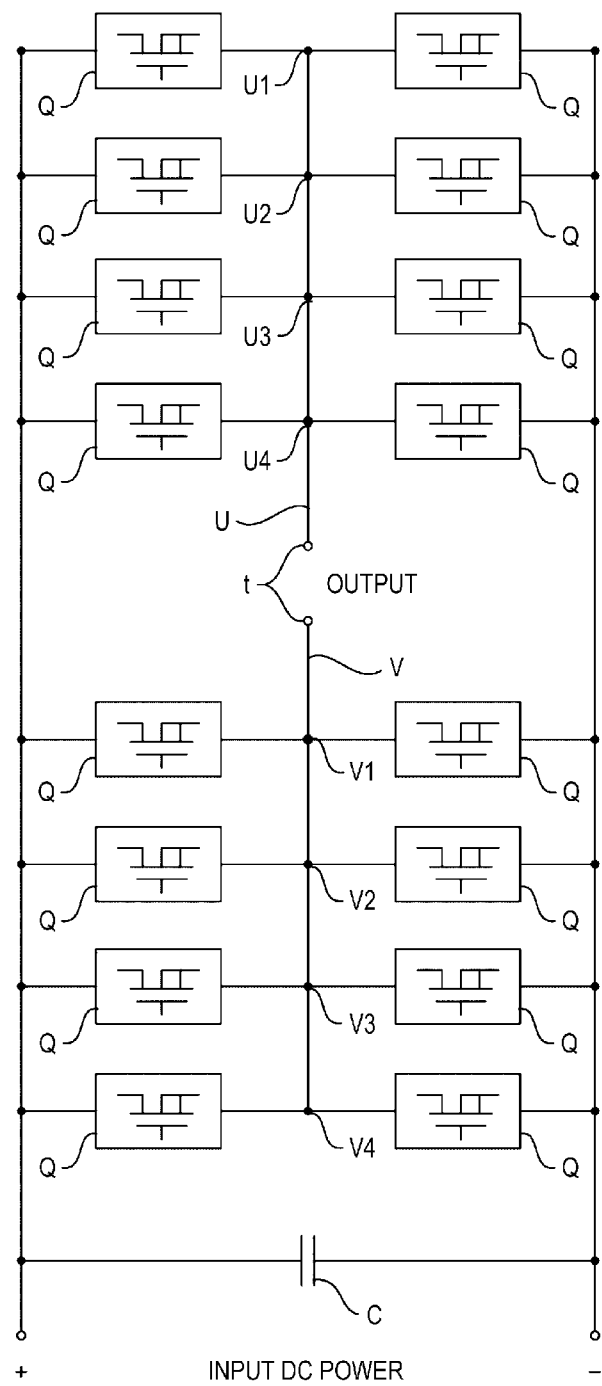
FIG. 12 is a circuit diagram illustrating power inverter circuits in a power supply apparatus of a first related art.
Figure 13:
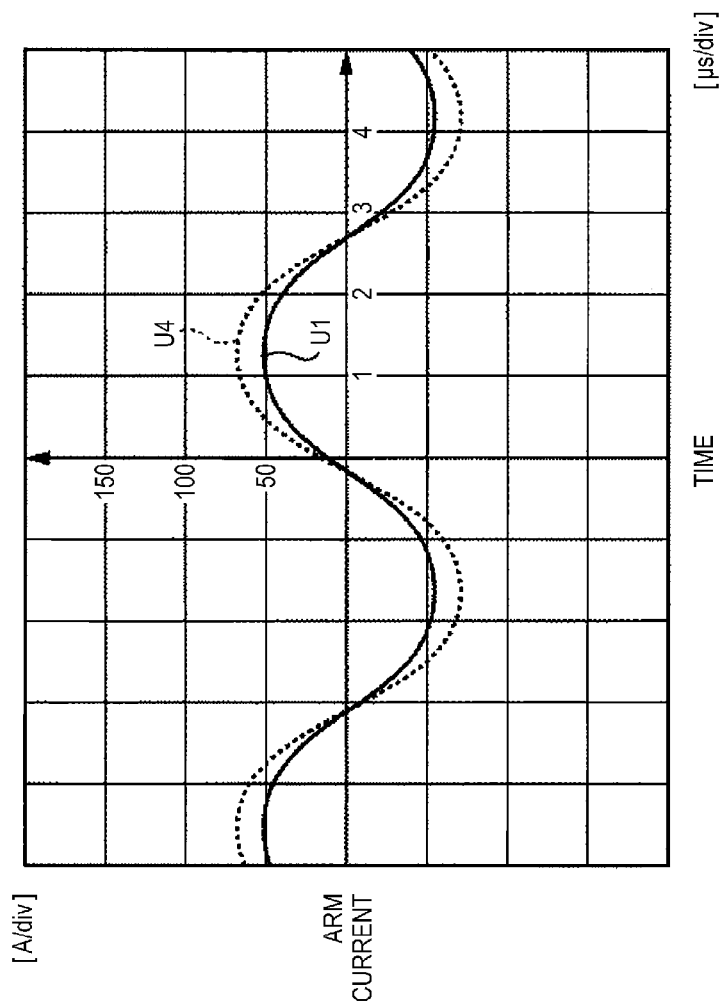
FIG. 13 is a waveform diagram illustrating a relation between current values of arms V1 and V4 of the power supply apparatus of FIG. 12.
Figure 14:
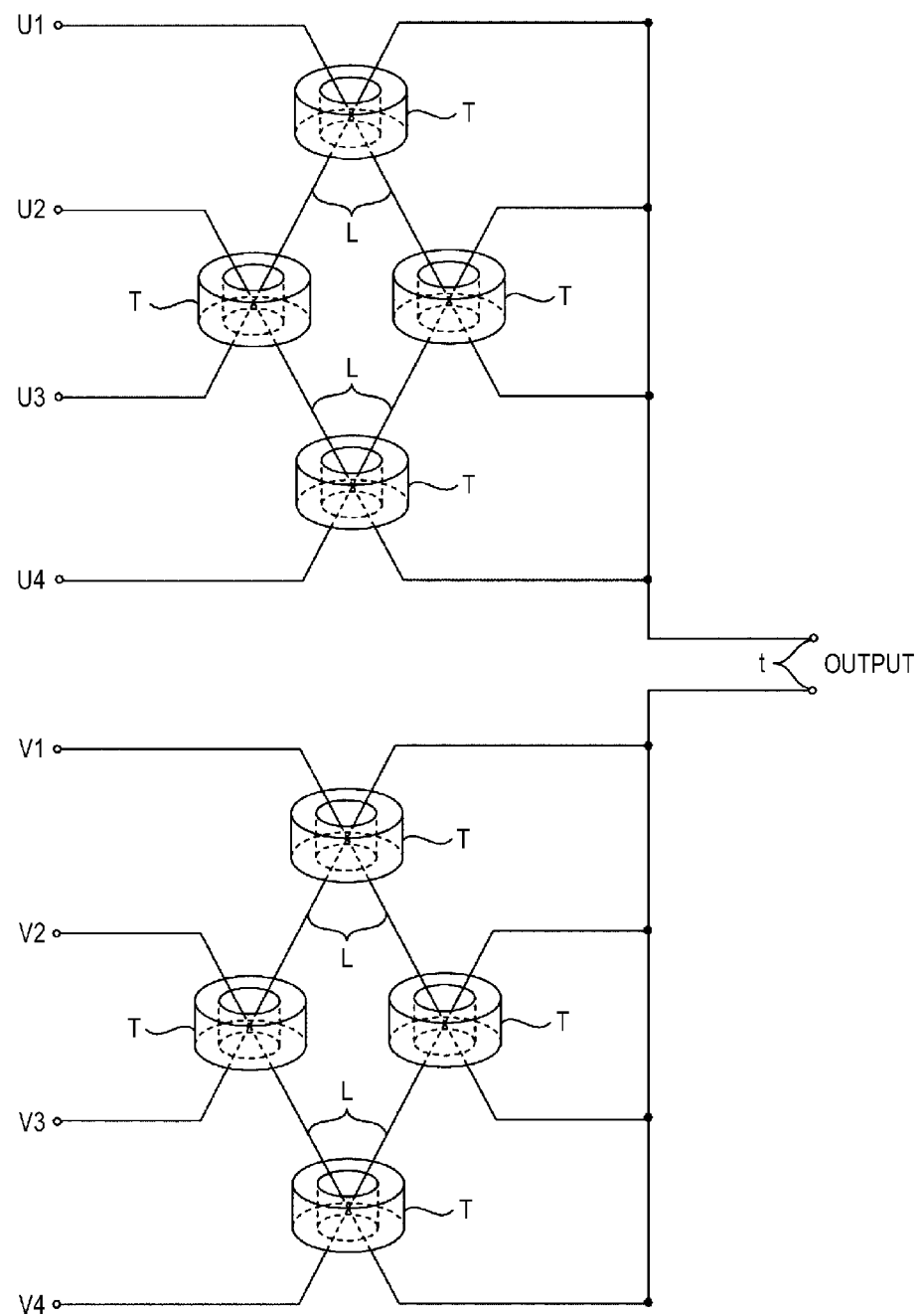
FIG. 14 is an explanatory diagram illustrating a configuration for achieving balance of output currents from power inverter circuits of a power supply apparatus in a second related art.
Figure 15:
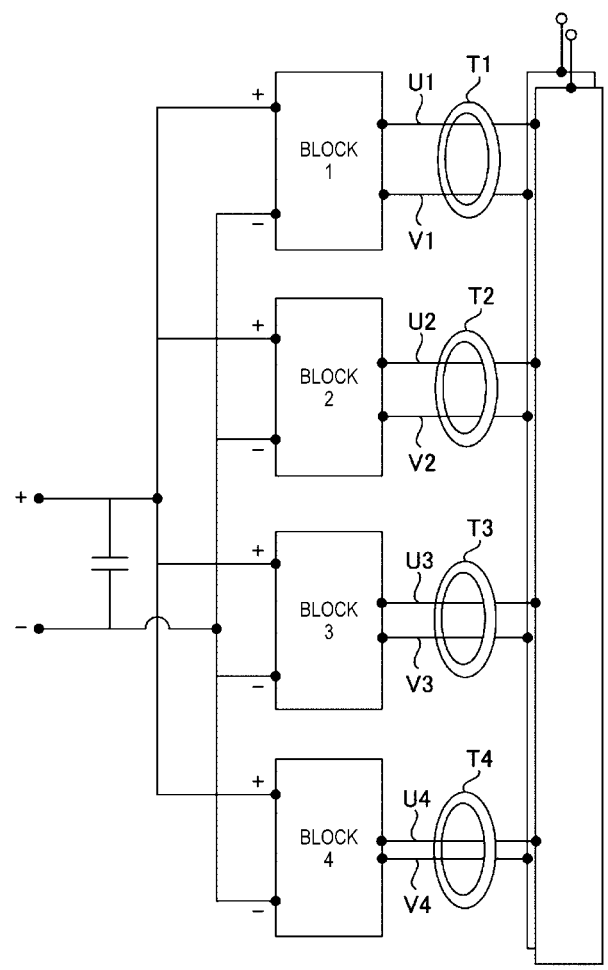
FIG. 15 is a block diagram of a power supply apparatus in a third related art.

The power conversion circuit 200 is not limited to one system, and may be a plurality of systems. As illustrated in FIG. 10, the power conversion circuit 200 may be, for example, configured as a plurality of power conversion circuits, each of which is configured to connect the power rectifier circuit 210 and the power inverter circuit 220. In this configuration illustrated in FIG. 10, a smoothing capacitor or the like may be provided between the power rectifier circuit 210 and the power inverter circuit 220.

The arms U1 to U4 and V1 to V4 are not limited to the metal pipes, wires, strips, or plates may be used.

Further, the conductive member 320 is not limited to the copper pipe, and any member functioning as the bus bar may be used. The present invention is not limited to the case in which the synthesized current output terminal 330 is provided at one end of the conductive member 320.

The switching element 222 of the power inverter circuit 220 is not limited to the transistor, and any switching element such as a thyristor may be used.

In addition, specific structure and sequence in carrying out the present invention may be modified to another configuration within a range within which the object of the present invention can be achieved.

This application is based on Japanese Patent Application No. 2017-174055 filed on Sep. 11, 2017, the entire content of which is incorporated herein by reference.

The invention claimed is:

1. An output current synthesizer that synthesizes output currents output from a plurality of power inverter circuits converting direct current power to alternating current power and outputs the synthesized output currents as synthesized current having a predetermined frequency, the output current synthesizer comprising:
   a pair of conductors which is connected to each of the power inverter circuits and to which the output currents of the power inverter circuits flow;
   a reactor which is provided on each of the pairs of conductors and generates magnetic flu x corresponding to a difference between values of currents flowing to the pairs of conductors to reduce the difference between the values of currents;
   a pair of conductive members to which the pairs of conductors are connected in parallel; and
   a pair of output terminals which is provided on the pair of conductive members and output the synthesized currents,
   wherein inductance between connecting positions of the pair of conductors which is connected at a position farthest away from the pair of output terminals in the pair of conductive members and the pair of output terminals is defined as a reference inductance,
   wherein one of the pairs of conductors has an interconductor distance correlated to a difference of the inductance between the connecting positions of the one of the pairs of conductors and the pair of output terminals, and the reference inductance,
   wherein each of the reactors has a first core member and a second core member that are mutually combined and form a ring into which the pair of conductors are insertable,
   wherein the ring includes two arcs extending in a separating direction of the pair of conductors on a circumference thereof, and
   wherein the first core member and the second core member are separatable in each of the two arcs in the separating direction with a surface intersecting the arcs as a boundary.

2. The output current synthesizer according to claim 1, wherein the first core member and the second core member have the same shape.

3. The output current synthesizer according to claim 2, wherein the pair of output terminals is provided at one end of the pair of conductive members in a longitudinal direction.

4. The output current synthesizer according to claim 1, wherein each of the reactors has a third core member disposed between facing surfaces of the first core member and the second core member that are separated, the facing surfaces facing each other in the separating direction.

5. The output current synthesizer according to claim 4, wherein the pair of output terminals is provided at one end of the pair of conductive members in a longitudinal direction.

6. The output current synthesizer according to claim 1, wherein the pair of conductors have a rectangular cross section and an inner circumference of the ring has a rectangular cross section.

7. The output current synthesizer according to claim 6, wherein the pair of output terminals is provided at one end of the pair of conductive members in a longitudinal direction.

8. A power supply apparatus comprising:
   a plurality of power inverter circuits configured to the convert direct current power to the alternating current power; and
   the output current synthesizer according to claim 1.

9. The power supply apparatus according to claim 8, wherein each of the power inverter circuits is a bridge type in which a plurality of switching elements are connected in a bridge shape.

10. The power supply apparatus according to claim 9, wherein each of the power inverter circuits converts the direct current power to the alternating current power.

11. The power supply apparatus according to claim 8, wherein each of the power inverter circuits converts the direct current power to the alternating current power.

12. The output current synthesizer according to claim 1, wherein the pair of output terminals is provided at one end of the pair of conductive members in a longitudinal direction.

13. The output current synthesizer according to claim 12, wherein the pair of conductors is connected in parallel to the pair of conductive members at intervals in the longitudinal direction of the pair of conductive members.

* * * * *